(12) United States Patent
Kim et al.

(10) Patent No.: US 7,620,397 B2
(45) Date of Patent: Nov. 17, 2009

(54) METHOD FOR MANAGING SCANNING OF CHANNELS IN A WIRELESS NETWORK

(75) Inventors: Byung Seo Kim, Hoffman Estates, IL (US); Ye Chen, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 518 days.

(21) Appl. No.: 11/426,777

(22) Filed: Jun. 27, 2006

(65) Prior Publication Data

US 2007/0298738 A1    Dec. 27, 2007

(51) Int. Cl.
H04W 4/00    (2009.01)

(52) U.S. Cl. .................. 455/434; 455/450; 455/464

(58) Field of Classification Search .......... 455/434, 455/450, 455, 452.1, 464, 509, 511, 515, 455/516, 103, 151.1, 166.2, 179.1, 199.1; 370/322, 329, 464

See application file for complete search history.

(56) References Cited

U.S. PATENT DOCUMENTS

| | | | | | |
|---|---|---|---|---|---|
| 5,636,243 | A | * | 6/1997 | Tanaka | 375/219 |
| 6,052,594 | A | * | 4/2000 | Chuang et al. | 455/450 |
| 7,133,380 | B1 | * | 11/2006 | Winters et al. | 370/329 |
| 2003/0224797 | A1 | * | 12/2003 | Kuan et al. | 455/446 |
| 2004/0042565 | A1 | * | 3/2004 | Garrett | 375/341 |
| 2004/0156336 | A1 | * | 8/2004 | McFarland et al. | 370/329 |
| 2004/0264504 | A1 | * | 12/2004 | Jin | 370/469 |
| 2005/0007979 | A1 | * | 1/2005 | Tsien et al. | 370/329 |
| 2005/0025182 | A1 | * | 2/2005 | Nazari | 370/469 |
| 2005/0163080 | A1 | * | 7/2005 | Suh et al. | 370/331 |
| 2005/0176420 | A1 | * | 8/2005 | Graves et al. | 455/424 |
| 2005/0201361 | A1 | * | 9/2005 | Morioka et al. | 370/352 |
| 2006/0068820 | A1 | * | 3/2006 | Sugaya et al. | 455/512 |
| 2006/0142004 | A1 | * | 6/2006 | He et al. | 455/434 |
| 2006/0153117 | A1 | * | 7/2006 | Bichot et al. | 370/316 |
| 2006/0171304 | A1 | * | 8/2006 | Hill et al. | 370/228 |
| 2006/0171332 | A1 | * | 8/2006 | Barnum | 370/254 |

* cited by examiner

Primary Examiner—Duc Nguyen
Assistant Examiner—Dominic E Rego
(74) Attorney, Agent, or Firm—Randi L. Karpinia; Indira Saladi

(57) ABSTRACT

A method for managing scanning of a plurality of channels in a wireless network is disclosed. The method comprises detecting by a station that a first channel in a plurality of channels is being used for a communication by another station, determining a duration of the communication based upon the communication information, setting a Network Allocation Vector for the station based on the determined duration, scanning a number of channels during the determined duration, and returning to the first channel upon at least one of a) completion of the step of scanning and b) an end of the determined duration.

17 Claims, 2 Drawing Sheets

US 7,620,397 B2

METHOD FOR MANAGING SCANNING OF CHANNELS IN A WIRELESS NETWORK

FIELD OF INVENTION

The present invention relates in general to wireless networks, and more specifically, to managing scanning of channels in wireless networks.

BACKGROUND OF INVENTION

A wireless network is a network of stations that wish to communicate with each other. Stations communicate on a radio frequency (RF) medium on channels. In particular, stations transmit and receive information on a serving channel. In addition to communicating with other stations on the serving channel, a station also needs to gather information regarding other channels in the network. The station gathers information regarding other channels in the network so that when the station needs to change channels (also called handoff) the station will have the necessary information for the handoff. Gathering information is done by a scanning process. In the scanning process, a first station leaves its serving channel and collects information about other channels in the wireless network. If a second station were to transmit data to the first station while the first station was scanning other channels, the data transmitted by the first station would be lost. Losing transmitted data is undesirable because the first station must retransmit the previously transmitted data. Having to retransmit previously transmitted data is called a retransmission penalty.

Techniques presently known to avoid the retransmission penalty include periodical scanning and power management driven scanning. Periodical scanning is performed when a station performs the scanning process according to a schedule, e.g. after a fixed time period. In other words, the time that the station will be on the serving channel and the time when the station will be away from the serving channel is periodical according to a schedule which is often predefined. In periodical scanning, the station needs to notify stations in its vicinity about its schedule so that the retransmission penalty is minimized. Power management driven scanning is performed when scanning is linked with a power save mechanism. In other words, the scanning process is performed during the time that a station is asleep, e.g., the station is not transmitting or receiving data for a predefined period of time. However power management driving scanning is suboptimal for periods of time where high amounts of data are transmitted, e.g. heavy loading periods. One reason is that during heavy loading periods the station has to stay awake for long periods of time which leads to delays in scanning. Another reason is that during heaving loading periods, the power management driven scanning process requires a power-save mechanism to be implemented at the station which adds complexity to the scanning process.

In light of the above discussion, there is a need for a new method for managing scanning of channels in a wireless network.

BRIEF DESCRIPTION OF DRAWINGS

The accompanying figures, where like reference numerals refer to identical or functionally similar elements throughout the separate views, and which, together with the detailed description below, are incorporated in and form part of the specification, serve to further illustrate various embodiments and to explain various principles and advantages, all in accordance with the present invention.

Figure 1:
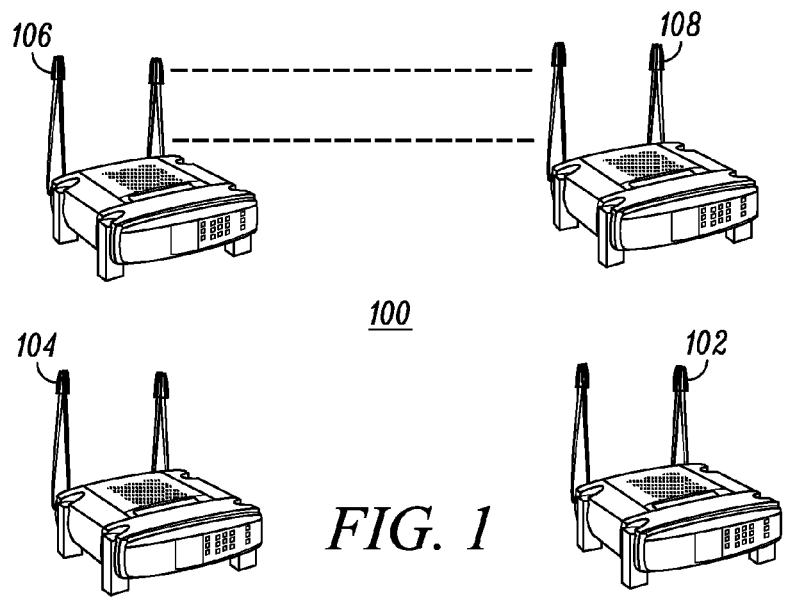
FIG. 1 illustrates an environment where various embodiments of the present invention can be practiced.

Skilled artisans will appreciate that elements in the figures are illustrated for simplicity and clarity and have not necessarily been drawn to scale. For example, the dimensions of some of the elements in the figures may be exaggerated relative to other elements to help in improving an understanding of embodiments of the present invention.

DETAILED DESCRIPTION OF DRAWINGS

Various embodiments of the present invention provide a method for managing scanning of channels in a wireless network. In an embodiment of the present invention, a station detects that a first channel is being used for communication by another station. The communication comprises frames carrying communication information. The method further comprises the station determining the duration of the communication based on the communication information. The station then sets a Network Allocation Vector for a time period based on the determined duration of the communication. In addition, the method comprises the station scanning a number of channels from the plurality of channels and retuning to the first channel upon completion of scanning or at the end of the determined duration.

Before describing in detail the particular method for managing scanning of channels in wireless networks, in accordance with various embodiments of the present invention, it should be observed that the present invention resides primarily in combinations of the apparatuses and components of the station. Accordingly, the apparatuses and components have been represented where appropriate by conventional symbols in the drawings, showing only those specific details that are pertinent for understanding the present invention, so as not to obscure the disclosure with details that will be readily apparent to those with ordinary skill in the art, having the benefit of the description herein.

In this document, relational terms such as first and second, and the like, may be used solely to distinguish one entity or action, from another entity or action without necessarily requiring or implying any actual such relationship or order between such entities or actions. The terms "comprises," "comprising,""includes," "including," or any other variation thereof, are intended to cover a non-exclusive inclusion, such that a process, method, article, or apparatus that comprises a list of elements does not include only those elements but may include other elements not expressly listed or inherent to such a process, method, article, or apparatus. An element proceeded by "comprises . . . a" does not, without more constraints, preclude the existence of additional identical elements in the process, method, article, or apparatus that comprise the element. Further, the term "another," as used in this document, is defined as at least a second or more.

FIG. 1 illustrates an environment where various embodiments of the invention can be practiced. The figure shows a wireless network 100 with a plurality of stations 102, 104, 106 and 108. The plurality of stations 102, 104, 106 and 108 are devices that conform to an Institute of Electrical and Electronics Engineers (IEEE) 802.11 protocol. Examples of the plurality of stations 102-108 include laptops, Personal Digital Assistants (PDA's), and mobile devices. The wireless network 100 comprises at least one radio frequency link called a channel. In other embodiments, the wireless network 100 may comprise more than one channel, e.g. where the stations in the wireless network 100 interface with other stations (not shown) communicating on other channels. In any case, a channel of the wireless network 100 that is used for communication between the stations in the wireless network 100 is called a serving channel.

FIG. 1 shows the station 106 communicating with station 108 on a first channel (also called the serving channel). The communication may comprise either voice or packet data. The present invention as described below explains managing the scanning process for station 102 in the wireless network 100. In other words, the present invention provides a method for managing scanning of channels in a wireless communication for stations not involved in a communication. It will be apparent to those skilled in the art that the stations in the wireless network are exemplary and not limiting in any way.

Figure 2:
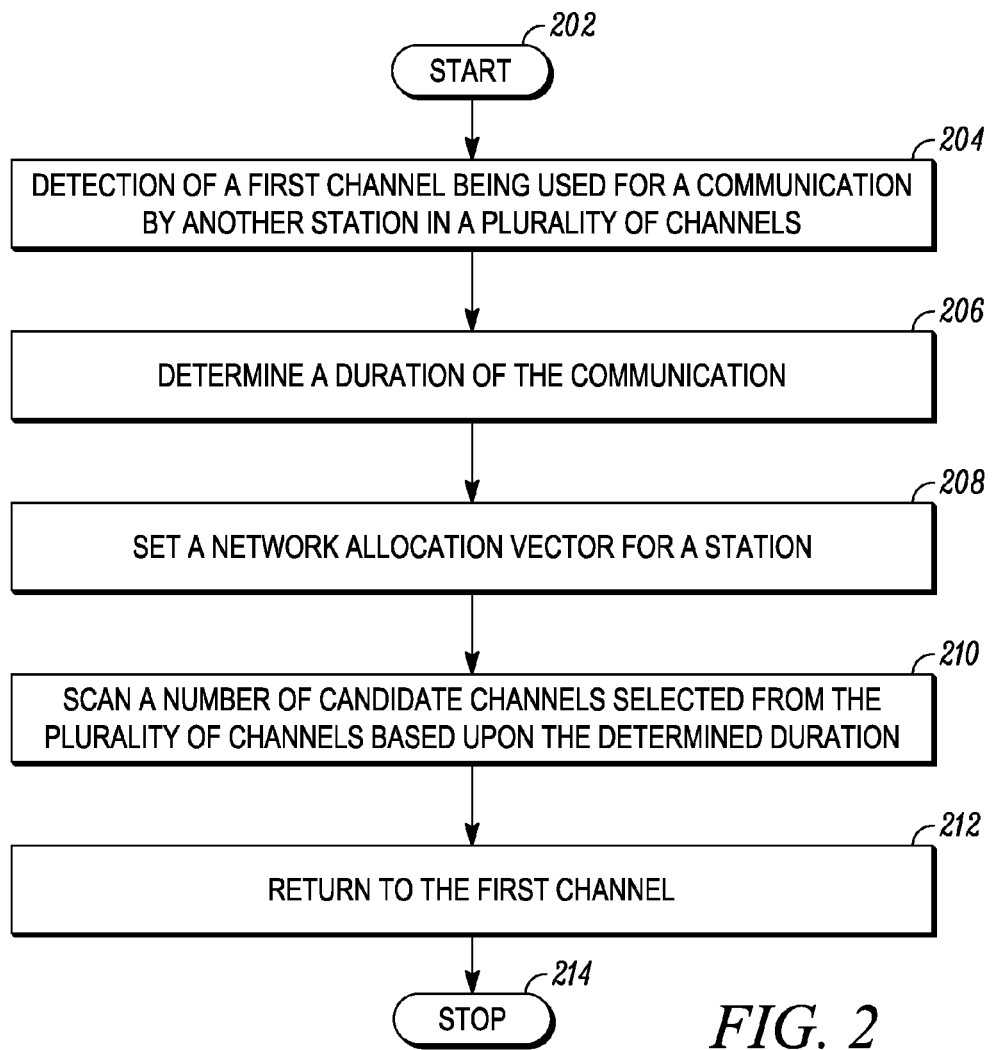
FIG. 2 is a flow chart illustrating a method for managing scanning of channels in wireless networks, in accordance with various embodiments of the present invention.

FIG. 2 is a flow chart illustrating a method for managing the scanning of channels in wireless networks, in accordance with various embodiments of the present invention. The flowchart is initiated at step 202. Each station from the plurality of stations 102-108 contends for the first channel for transmission of data. For exemplary purposes, one of the stations 106, 108 wins the contention for the first channel and subsequently commences communication. During the communication, the stations 106 and 108 set a Network Allocation Vector (NAV). The NAV is an indicator of the time for which the stations 106 and 108 will transmit data on the first channel.

At step 204, a station in the wireless network that is not involved in the communication, e.g. station 102, detects that the first channel is being used for communication by stations 106 and 108. As such, an embodiment of the present invention may be performed by any station in the wireless network 100 that is not involved in the communication and reference to station 102 is made for ease of description. As such, the mention of station 102 is not meant to be a limitation. In any case, the communication between the stations 106 and 108 comprises frames that carry communication information. In one embodiment, the communication information comprises the NAV set by stations 106 and 108, the amount of data to be communicated, the data rate for the communication and the addresses of the stations 106 and 108 using the first channel for communication.

At step 206, station 102 determines the duration of the communication. The station 102 extracts this information from the communication information. In an embodiment, the station 102 calculates the communication duration from the NAV of the stations 106 and 108. In another embodiment of the present invention, the communication information identifies a NAV of a transmitter and/or a receiver. In this embodiment, the station 106 is referred to as the transmitter and the station 108 is referred to as the receiver. Thus, the communication information comprises the NAV of the transmitter station 106 and/or the NAV of the receiver station 108.

At step 208, the station 102 sets a NAV. In other words, all other stations not involved in the communication and whose serving channel is the first channel set a NAV. As is known to one of ordinary skill in the art, the NAV is an indicator maintained by stations 106, 108 of the time periods during which the other stations, e.g. stations 102, 104 in the wireless network 100 cannot communicate over the first channel. The NAV is used within an IEEE 802.11 wireless local area network to prevent a station from accessing a serving channel. Hence, once the station 102 sets the NAV, station 102 will not contend for the first channel.

At step 210, the station 102 scans a number of candidate channels for the determined duration of the communication as determined in step 206. The number of candidate channels is selected from the plurality of channels in the wireless network 100. In an embodiment, the step of scanning is performed iteratively. In another embodiment, the step of scanning is performed based on a scanning rule. The scanning rule is explained in further detail in conjunction with the description of FIG. 3.

At step 212, the station 102 returns to the first channel. The station 102 returns to the first channel after completing the scanning of the number of channels and/or at the end of the determined duration. In an embodiment of the invention, the time taken for the scanning of the number of candidate channels is bounded by the communication duration. In this embodiment, the station 102 will return to the first channel once the communication duration is over. The stations 106 and 108 may once again contend for the first channel once their communication is complete. During this time, other stations may also contend for the first channel. Further, even if the station 102 is not finished with the step of scanning, the station 102 will return to the first channel at a time when the end of the determine duration occurs. In any case, the method is terminated at step 214.

Figure 3:
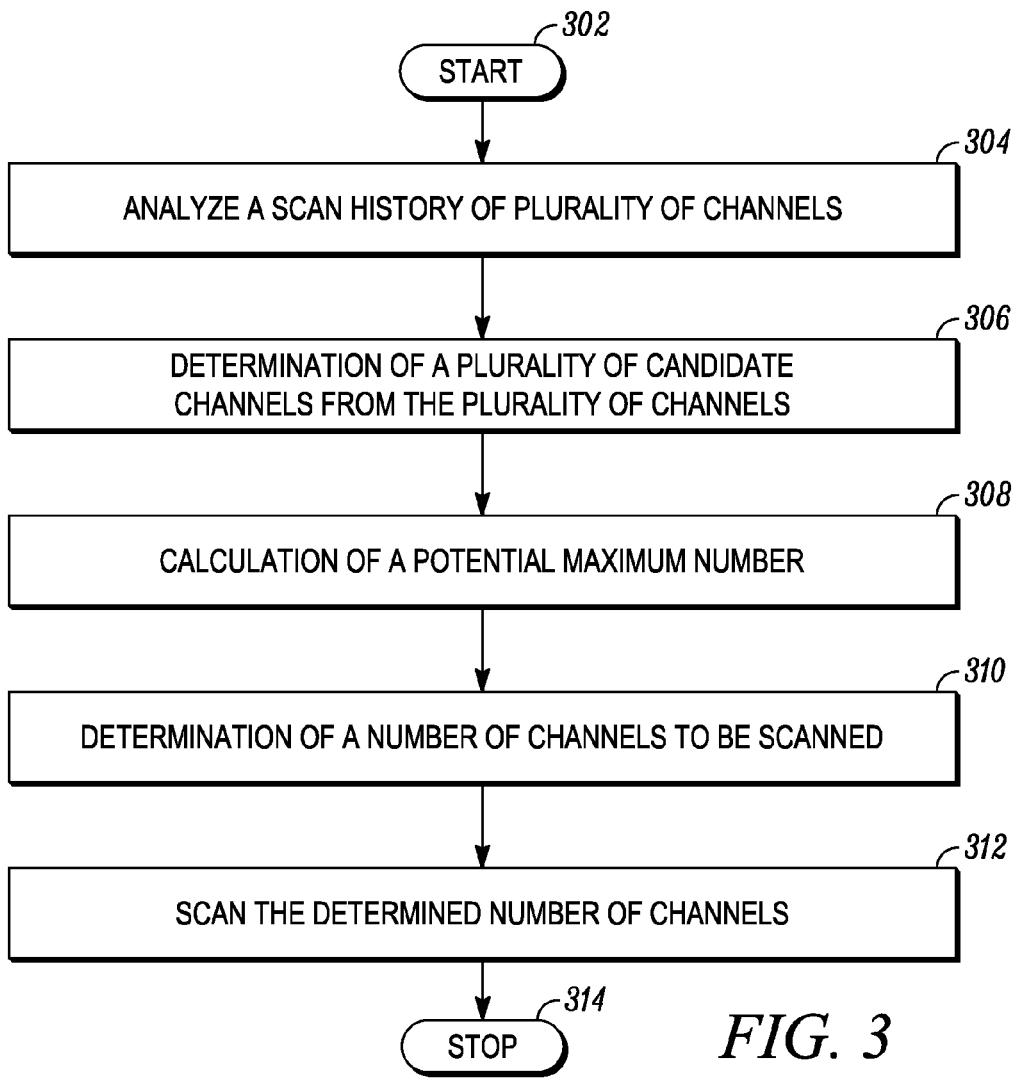
FIG. 3 is a flow chart illustrating a method for selecting a number of channels to be scanned, in accordance with various embodiments of the present invention.

FIG. 3 is a flow chart illustrating a method for managing scanning of channels in wireless networks, in accordance with various embodiments of the present invention. This method may be invoked after the station 102 has set its NAV. The method is initiated at step 302. At step 304, the station 102 analyzes a scan history of a plurality of channels in the wireless network 100.

The scan history is a list detailing information that may be potentially useful during the scanning process. In one embodiment of the invention, the scan history for the plurality of channels is stored in a station. In such an embodiment, the station 102 stores the scan history of the plurality of channels. In another embodiment of the invention, the scan history of the plurality of channels is stored at a central location accessible by all the stations in the wireless network 100. In any case, the scan history comprises information regarding a scanning duration for a channel, a next scanning opportunity and a previous scanning opportunity for a channel, the frequency required for scanning and a signal strength histogram of a channel. In one embodiment, the scanning duration for a channel is the time required by a station to scan that channel, the next scanning opportunity for a channel denotes the next point of time at which the channel can be scanned, the previous scanning opportunity for a channel denotes the point of time at which the channel could have been scanned, the signal strength histogram of a channel is a graph that shows the strength of the channel at a present location of the station.

At step 306, the station 102 determines the plurality of candidate channels to be scanned, based on a first condition. At the same time, other stations in the wireless network 100, e.g. station 104, may also determine the plurality of candidate channels to be scanned. In an embodiment of the present invention, the first condition is satisfied if a particular channel i is a candidate channel for the station 102, where the first condition may be defined as satisfied when the following equation is met $(T_{Next\_Scan}^{i} - T_{NAV\_End}) \leq T_{Scan\_Int}$, where $T_{Next\_Scan}^{i}$ is a scheduled next scan time for the particular channel i, $T_{NAV-End}$ is an end time of the determined duration of communication, and $T_{Scan\_Int}$, is a scan interval (time taken by the station 102 to scan the particular channel i).

In one embodiment, the value for $T_{Next\_Scan}^{i}$ is extracted from the scan history of a particular channel I and the value for $T_{NAV\text{-}End}$ is determined from the NAV set for the station 102. If the particular channel i satisfies the above stated condition, then it is selected as a candidate channel for the station 102 else it is discarded. The first condition is checked for the plurality of channels by the station 102. In one embodiment, the number of the particular channels that satisfy the first condition stored in a list is mathematically denoted by $n_f$. The above stated condition may also be checked by other stations, e.g. station 104, in the wireless network 100.

At step 308, a potential maximum number is determined by the station 102. The potential maximum number for a station describes the maximum number of channels that can theoretically be scanned by the station for the determined duration indicated by the NAV. In an embodiment of the invention, each station in the wireless network 100 may have a different potential maximum number. For example, station 102 and station 104 may have different values. In an embodiment of the present invention, the determination for the potential maximum number is calculated based on a ratio, $$\left\lfloor \frac{D_{NAV}}{T_{scan}} \right\rfloor,$$

where $D_{NAV}$ is the determined duration of communication and $T_{scan}$ is a scanning duration of the channel. In other words, the potential maximum number for the station 102 is calculated by taking the floor of the ratio of the duration of the NAV and the time taken by the station 102 to scan a channel. The above calculation may also be done for other stations in the wireless network 100, e.g. station 104.

At step 310, the station 102 determines a number of channels to be scanned. In an embodiment of the present invention, the number of channels to be scanned for station 102 is determined by taking a minima, a mathematical function, of the determined plurality of candidate channels ($n_f$) and the potential maximum number $$\left\lfloor \frac{D_{NAV}}{T_{scan}} \right\rfloor$$

Mathematically, the above statement can be expressed as, $$N_f = \text{Min}\left(n_f, \left\lfloor \frac{D_{NAV}}{T_{scan}} \right\rfloor\right),$$

where $N_f$ is the number of channels for station 102 to scan. The above stated calculation may also be performed by other stations in the wireless network 100, e.g. station 104. In any case, if the potential maximum number $$\left\lfloor \frac{D_{NAV}}{T_{scan}} \right\rfloor$$

is less than the determined plurality of candidate channels ($n_f$), the station 102 will choose $$\left\lfloor \frac{D_{NAV}}{T_{scan}} \right\rfloor$$

channels from the determined plurality of candidate channels (nf) based on at least one of the following criteria: 1) whether a higher priority is assigned to the candidate channel that has the earliest scheduled next scan time ($T_{Next\_Scan}^{i}$), and 2) whether a higher priority is assigned to the candidate channel that has the strongest signal strength histogram, which is likely the channel that the station 102 will hand over on.

At step 312, the station 102 scans its determined number of channels. After scanning the minimum number of candidate channels, the station 102 updates the scan history with information gained from the scanning process. Thereafter, the method is terminated at step 314.

Figure 4:
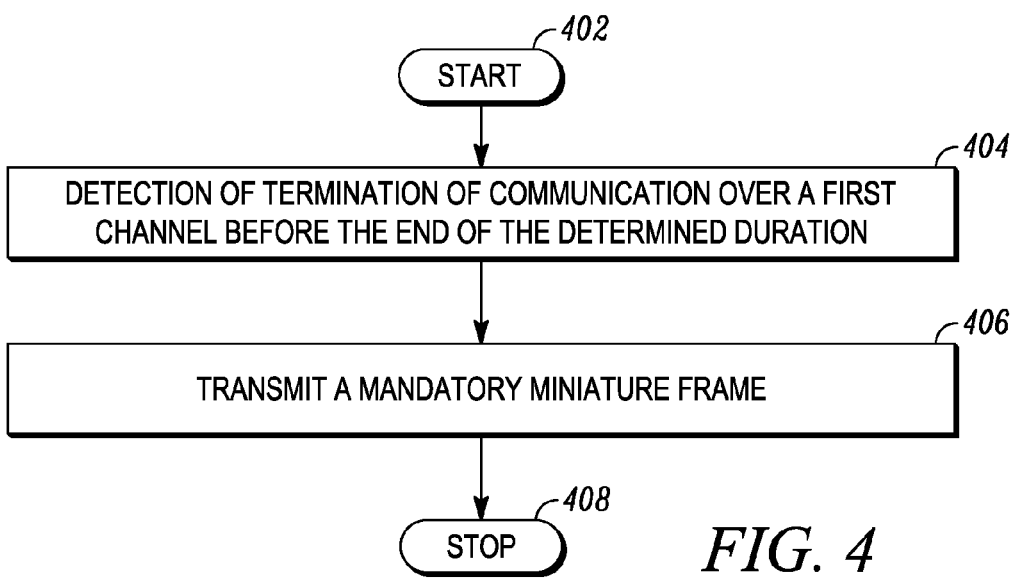
FIG. 4 is a flow chart illustrating a method for minimizing loss of data when communication terminates before the end of a determined duration of communication, in accordance with various embodiments of the present invention.

FIG. 4 is a flow chart illustrating a method for minimizing loss when the communication terminates before the end of determined duration of communication, in accordance with various embodiments of the present invention. This method describes a scenario where the communication between stations 106 and 108 is terminated before the previously determined duration of communication. The method is initiated at step 402. At step 404, a first station, e.g. station 102, station 104, or another station (not shown), in the wireless network 100 detects that the communication between the stations 106 and 108 on the first channel has terminated before the end of the determined duration. In an embodiment, the stations 106 and 108 reset the NAV when the communication between them is lost prematurely. In this embodiment, the first station detects the termination, e.g. upon receiving the reset NAV from at least one of the stations 106 and 108. The first station upon detecting the termination of the communication, commences contention for the first channel. In an embodiment of the present invention, the first station wins the contention for the first channel. In this embodiment, the first station wins the contention in order to facilitate communication with a second station in the wireless network 100, e.g. station 108.

At step 406, the first station transmits a mandatory miniature frame to the second station prior to sending a communication message, which as mentioned before is before the end of the determined duration. The first station transmits the mandatory miniature frame as the second station is unaware of the status of the first station. In an embodiment of the present invention, the mandatory miniature frame, transmitted by the first station, is a Request To Send (RTS) miniature frame. When the first station sends the mandatory miniature frame to the second station, the second station may be either on the first channel ready to communicate with the first station or the second station is performing scanning and away from the first channel.

If the second station is on the first channel, it will receive the RTS miniature frame and send an acknowledgement by transmitting a Clear to Send (CTS) miniature frame to the first station. The first station upon receiving the CTS miniature frame, will know that the second station is ready to communicate. If the second station is away from the first channel, the first station will retransmit the mandatory miniature frame to the second station which may minimize the retransmission penalty. In any case, the method of FIG. 4 does not apply to communications when the determined duration is over.

The present invention may provide an effective solution to schedule the scanning process in stations in a wireless network. The invention may be efficient under periods of heavy loading as the stations can utilize idle time for the scanning process. An embodiment of the present invention may also cater to scenarios where the communication is terminated before the determined duration. In such a scenario the invention may minimize the loss of data by sending mandatory miniature frames. Furthermore, no extra complexity may be required in either the station or the infrastructure to implement an embodiment of the present invention.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for managing scanning of a plurality of channels at a station, the method comprising:
   detecting that a first channel in a plurality of channels is being used for a communication by another station, wherein the communication comprises frames carrying communication information;
   determining a duration of the communication based upon the communication information;
   setting a Network Allocation Vector for the station based on the determined duration;
   selecting a number of channels from a plurality of candidate channels, wherein the plurality of candidate channels is determined by $(T_{Next\_Scan}^{i} - T_{NAV\_End}) \leq T_{Scan\_Int}$, where $T_{Next\_Scan}^{i}$ is a scheduled next scan time for channel i, $T_{NAV\_End}$ is an end time of the determined duration, and $T_{Scan\_Int}$ is a scan interval;
   scanning the number of channels wherein the scanning is performed during the determined duration; and
   returning to the first channel upon at least one of a) completion of the step of scanning and b) an end of the determined duration.

2. The method of claim 1 further comprising updating a scan history based on the step of scanning the number of channels.

3. The method of claim 2 wherein the scan history comprises at least information regarding a second channel, a scanning duration, a next scanning opportunity, a previous scanning opportunity, and a signal strength histogram of the number of channels.

4. The method of claim 1, wherein the communication information comprises at least one of a Network Allocation Vector for the another station, a data rate for the communication, and an address of the another station using the first channel for communication.

5. The method of claim 1 wherein the step of scanning is performed iteratively until each channel in the plurality of channels has been scanned.

6. The method as recited in claim 1 wherein the step of returning further comprises contending for the first channel.

7. The method as recited in claim 1 wherein the communication information identifies a Network Allocation Vector for at least one of a transmitter and a receiver involved in the communication.

8. The method of claim 7, wherein determining the duration of the communication is based upon the Network Allocation Vector at least one of the transmitter and the receiver.

9. The method of claim 1, wherein the first condition comprises at least one of a scan interval and an end of the determined duration.

10. The method of claim 1, wherein the number of a plurality of candidate channels is mathematically denoted by $n_f$.

11. The method as recited in claim 1, wherein selecting the number of channels further comprises:
   calculating a potential maximum number based on the determined duration and time taken to scan a channel; and
   determining the number of channels as the minima of an administrator set number of channels and the potential maximum number.

12. The method of claim 11, wherein determining the number of candidate channels further comprises calculating $$N_f = \mathrm{Min}\left(n_f, \left\lfloor \frac{D_{NAV}}{T_{scan}} \right\rfloor \right),$$

where $D_{NAV}$ is the determined duration, and $T_{scan}$ is a scanning duration for a channel.

13. The method of claim 11 further comprising if the potential maximum number $$\left\lfloor \frac{D_{NAV}}{T_{scan}} \right\rfloor$$

is less than the plurality of candidate channels ($n_f$), selecting the potential maximum number $$\left\lfloor \frac{D_{NAV}}{T_{scan}} \right\rfloor$$

from the plurality of candidate channels based on at least one of a) a priority assigned to the candidate channel that has the earliest scheduled next scan time ($T_{Next\_Scan}^{i}$), and b) a priority assigned to the candidate channel that has the strongest signal strength histogram.

14. The method of claim 1 further comprising sending a mandatory miniature frame before an end of the determined duration on the first channel.

15. The method of claim 14, wherein the mandatory miniature frame is a Request To Send (RTS) frame.

16. The method of claim 1 further comprising:
   detecting that the communication terminates on the first channel before the end of the determined duration; and
   transmitting a mandatory miniature frame to a station on the first channel prior to sending data.

17. The method of claim 16 wherein the mandatory miniature frame is a Request To Send (RTS) frame.

* * * * *